United States Patent
Okabe et al.

(10) Patent No.: US 8,682,668 B2
(45) Date of Patent: Mar. 25, 2014

(54) LANGUAGE MODEL SCORE LOOK-AHEAD VALUE IMPARTING DEVICE, LANGUAGE MODEL SCORE LOOK-AHEAD VALUE IMPARTING METHOD, AND PROGRAM STORAGE MEDIUM

(75) Inventors: Koji Okabe, Tokyo (JP); Ryosuke Isotani, Tokyo (JP); Kiyoshi Yamabana, Tokyo (JP); Ken Hanazawa, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 12/992,760

(22) PCT Filed: Mar. 27, 2009

(86) PCT No.: PCT/JP2009/056324
§ 371 (c)(1),
(2), (4) Date: Nov. 15, 2010

(87) PCT Pub. No.: WO2009/139230
PCT Pub. Date: Nov. 19, 2009

(65) Prior Publication Data
US 2011/0191100 A1 Aug. 4, 2011

(30) Foreign Application Priority Data
May 16, 2008 (JP) ................................ 2008-129937

(51) Int. Cl.
*G10L 15/02* (2006.01)
*G10L 15/04* (2013.01)
*G10L 15/06* (2013.01)

(52) U.S. Cl.
USPC ........... 704/251; 704/231; 704/235; 704/240; 704/254; 704/255

(58) Field of Classification Search
USPC .................. 704/251, 231, 254, 255, 235, 240
See application file for complete search history.

(56) References Cited

U.S. PATENT DOCUMENTS 5,799,065 A * 8/1998 Junqua et al. ............... 379/88.03
5,822,730 A * 10/1998 Roth et al. .................... 704/255

(Continued)

FOREIGN PATENT DOCUMENTS

JP 05-197395 A 8/1993
JP 07-104780 A 4/1995

(Continued)

OTHER PUBLICATIONS

V. Steinbiss, B. H. Tran, H. Ney, "Improvements in Beam Search", Proceedings ICSLP, Yokohama, 1994, vol. 4, pp. 2143-2146.*

(Continued)

*Primary Examiner* — Pierre-Louis Desir
*Assistant Examiner* — Abdelali Serroli
(74) *Attorney, Agent, or Firm* — Sughrue Mion, PLLC

(57) ABSTRACT

A speech recognition apparatus that performs frame synchronous beam search by using a language model score look-ahead value prevents the pruning of a correct answer hypothesis while suppressing an increase in the number of hypotheses. A language model score look-ahead value imparting device 108 is provided with a word dictionary 203 that defines a phoneme string of a word, a language model 202 that imparts a score of appearance easiness of a word, and a smoothing language model score look-ahead value calculation means 201. The smoothing language model score look-ahead value calculation means 201 obtains a language model score look-ahead value at each phoneme in the word from the phoneme string of the word defined by the word dictionary 203 and the language model score defined by the language model 202 so that the language model score look-ahead values are prevented from concentrating on the beginning of the word.

32 Claims, 8 Drawing Sheets

(56) References Cited

U.S. PATENT DOCUMENTS

| | | | |
|---|---|---|---|
| 5,946,655 A | 8/1999 | Steinbiss et al. | |
| 5,956,678 A * | 9/1999 | Hab-Umbach et al. | 704/256.4 |
| 5,970,450 A * | 10/1999 | Hattori | 704/239 |
| 5,987,409 A | 11/1999 | Tran et al. | |
| 5,995,930 A * | 11/1999 | Hab-Umbach et al. | 704/254 |
| 6,285,786 B1 * | 9/2001 | Seni et al. | 382/187 |
| 6,484,141 B1 * | 11/2002 | Tomoeda | 704/254 |
| 6,871,341 B1 * | 3/2005 | Shyr | 717/131 |
| 6,963,837 B1 * | 11/2005 | Finke et al. | 704/256 |
| 6,980,954 B1 * | 12/2005 | Zhao et al. | 704/251 |
| 7,043,422 B2 * | 5/2006 | Gao et al. | 704/9 |
| 7,072,835 B2 * | 7/2006 | Konuma et al. | 704/251 |
| 7,181,398 B2 * | 2/2007 | Thong et al. | 704/254 |
| 7,587,319 B2 * | 9/2009 | Catchpole | 704/235 |
| 7,734,460 B2 * | 6/2010 | Yu et al. | 704/9 |
| 7,774,197 B1 * | 8/2010 | Bulyko | 704/9 |
| 7,801,727 B2 * | 9/2010 | Gopalakrishnan et al. | 704/251 |
| 7,904,296 B2 * | 3/2011 | Morris | 704/254 |
| 7,930,181 B1 * | 4/2011 | Goffin et al. | 704/256.7 |
| 7,941,317 B1 * | 5/2011 | Goffin et al. | 704/256.7 |
| 8,036,893 B2 * | 10/2011 | Reich | 704/257 |
| 8,150,693 B2 * | 4/2012 | Mori et al. | 704/257 |
| 2002/0128836 A1 * | 9/2002 | Konuma et al. | 704/251 |
| 2003/0187643 A1 * | 10/2003 | Van Thong et al. | 704/254 |
| 2004/0148164 A1 * | 7/2004 | Baker | 704/231 |
| 2004/0158468 A1 * | 8/2004 | Baker | 704/238 |
| 2005/0010412 A1 * | 1/2005 | Aronowitz | 704/254 |
| 2005/0251390 A1 * | 11/2005 | Catchpole | 704/242 |
| 2005/0288929 A1 * | 12/2005 | Kuboyama et al. | 704/251 |
| 2006/0009965 A1 * | 1/2006 | Gao et al. | 704/9 |
| 2007/0136061 A1 | 6/2007 | Kuboyama et al. | |
| 2007/0143112 A1 * | 6/2007 | Yu et al. | 704/257 |

FOREIGN PATENT DOCUMENTS

| | | |
|---|---|---|
| JP | 07-295587 A | 11/1995 |
| JP | 10-105189 A | 4/1998 |
| JP | 10-171490 A | 6/1998 |
| JP | 2000-075885 A | 3/2000 |
| JP | 2003-140685 A | 5/2003 |
| JP | 2004-191705 A | 7/2004 |
| JP | 2005-221727 A | 8/2005 |
| JP | 2007-163896 A | 6/2007 |

OTHER PUBLICATIONS

S. Ortmanns et al., "Language-Model Look-Ahead for Large Vocabulary Speech Recognition", ICSIP, 1996, pp. 1-4.

* cited by examiner

CONCENTRATED ON BEGINNING OF WORD

CONCENTRATED ON BEGINNING OF WORD

LANGUAGE MODEL SCORE LOOK-AHEAD VALUE IMPARTING DEVICE, LANGUAGE MODEL SCORE LOOK-AHEAD VALUE IMPARTING METHOD, AND PROGRAM STORAGE MEDIUM

CROSS-REFERENCE TO RELATED APPLICATION

This is a 371 of PCT Application No. PCT/JP2009/056324 filed Mar. 27, 2009, which claims priority from Japanese Patent Application No. 2008-129937, filed on May 16, 2008, all of which is incorporated herein in its entirety by reference.

TECHNICAL FIELD

The present invention relates to a speech recognition apparatus that performs frame synchronous beam search by using a language model score look-ahead value, and a language model score look-ahead value imparting device suitable for the speech recognition apparatus.

BACKGROUND ART

A high-performance speech recognition apparatus such as a large vocabulary continuous speech recognition apparatus calculates the acoustic similarity and the language similarity between various hypotheses (recognition candidates) predicted from three sources of knowledge of an acoustic model, a word dictionary, and a language model and an unknown input speech as an acoustic model score and a language model score, and outputs the most probable hypothesis as the recognition result. Further, in order to limit the number of hypotheses that are held in the apparatus to eliminate the calculation amount and the memory capacitance, the acoustic model score and the language model score at each time are comprehensively evaluated. Then, a hypothesis having poor score is pruned as being less probable, thus preventing the following hypotheses from being deployed. This method is called frame synchronous beam search method (hereinafter simply referred to as beam search method).

One example of the speech recognition apparatus is shown in FIG. 6. In FIG. 6, speech waveforms that are speech recognition targets are input to a speech input means 301, and are transmitted to an acoustic analysis means 302. The acoustic analysis means 302 calculates an acoustic feature amount by a unit of frame, and outputs the acoustic feature amount to a distance calculation means 303. The distance calculation means 303 calculates the distance between the input acoustic feature amount and each model in an acoustic model 304, and outputs an acoustic model score according to the distance to a searching means 305. The searching means 305 obtains an accumulated score by adding the acoustic model score and a language model score by a language model 402 obtained from a language model score look-ahead value imparting device 308 for all the hypotheses that are to be searched, and prunes the hypothesis having poor accumulated score. The remaining hypotheses are processed, and the optimal recognition result is output from a recognition result output means 309.

One example of a part of a word dictionary 403 is shown in FIG. 7. The word dictionary 403 in this example is a tree structure dictionary. Further, in FIG. 7, a language model score in each word given by the language model 402 is added. For example, a word "handshake" (Japanese pronunciation: "akusyu") has a phoneme string of "a-k-u-sy-u", and its language model score is 80. Further, a word "red" (Japanese pronunciation: "akai") has a phoneme string of "a-k-a-i", and its language model score is 50. In this example, smaller language model score indicates high score.

When such a tree structure dictionary is used, the root part of the tree structure is connected to the previous hypothesis in inter-word transition. However, since the connected word cannot be specified at this time, the language model score cannot be added to the accumulated score. If the language model score is added to the accumulated score for the first time when the hypothesis reaches any word end terminal, the scores greatly vary by the hypotheses around the inter-word transition. Accordingly, the beam width needs to be made large to prevent pruning even when the score of the correct answer hypothesis greatly varies, which inhibits efficient beam search.

In order to add the language model score as early as possible, the language model score look-ahead value imparting device 308 includes an optimal language model score acquisition means 401 that acquires the optimal value of the language model score of the word corresponding to each branch of the tree structure dictionary as the optimistic language model score in the branch.

More specifically, the optimal language model score acquisition means 401 acquires the optimal value of the language model score $-\log\{p(w|h)\}$ in a word w that belongs to the set of the word W(s) that can be traced from the phoneme s in the dictionary for the language model score look-ahead value $\pi h(s)$ of the hypothesis of the phoneme s having the word history h using the word dictionary 403 and the language model 402 as shown in the expression (1). When the hypothesis transits to the phoneme s in the search process by the searching means 305, the difference value $\delta h(s)$ between the language model score look-ahead value of the previous phoneme s~ and the language model score look-ahead value of the current phoneme s shown in the expression (2) is added to the accumulated score of the hypothesis.

$$\pi h(s) = \min w \in W(s)\{-\log p(w|h)\} \quad (1)$$

$$\delta h(s) = \pi h(s) - \pi h(s\sim) \quad (2)$$

An example of the language model score look-ahead value given by the above operation is shown in FIG. 8. The right value of the end terminal phoneme indicates the language model score of each word, and the value in each branch indicates the language model score look-ahead difference value imparted to the branch. In this example, the language model score of 50 can be added to the accumulated score when the root part of the tree structure is connected to the previous hypothesis. Thus, efficient beam search can be performed compared with a case in which the language model score is added to the accumulated score for the first time when the hypothesis reaches the word end terminal.

The above optimal language model score acquisition means 401 is disclosed in Non-patent document 1. The Non-patent document 1 discloses two methods of look-ahead of a unigram language model score and that of a bigram language model score. The look-ahead of the unigram language model score uses the unigram language model score as the language model score look-ahead difference value. In this method, when the hypothesis reaches the word end terminal of the tree structure dictionary and the word is defined, the unigram language model score that has been used is discarded, and the defined bigram language model score is added. This processing that is performed when the hypothesis reaches the word end terminal is called word end processing. On the other hand, the look-ahead of the bigram language model score uses the bigram language model score from the step of look-ahead. The searching means 305 shown in FIG. 6 includes a word end processing means 307 in addition to a original searching means 306 that performs original search, and corresponds to the example that uses the look-ahead method of the unigram language model score.

CITATION LIST

Non-patent Literature 1

S. Ortmanns et al. "LANGUAGE-MODEL LOOK-AHEAD FOR LARGE VOCABULARY SPEECH RECOGNITION" ICSLP 1996

SUMMARY OF INVENTION

Technical Problem

In the look-ahead of the language model score by the optimal language model score acquisition means 401 described above, the optimal value of the language model score of the word corresponding to each branch in the tree structure dictionary is set to the language model score in the branch. When all of the language model scores of the word corresponding to each branch are low, most of the poor language scores are added to these words at an earlier point, and even when the hypothesis is the correct answer hypothesis, it may be pruned. The specific example will be described below.

FIG. 9 shows an example of a word dictionary and a language model score look-ahead value using the tree structure dictionary as the word dictionary 403. In FIG. 9, the recognition target word includes "snack" (Japanese pronunciation: "okasi"), and no word starting with the chain of the phonemes "o" and "k" is included except "okasi" (meaning: "snack"). In this case, the optimal language model score acquisition means 401 imparts the language model score look-ahead value "50" to the branch that leads to "o". Since there is no phoneme in the phoneme "k" and the following phonemes having branching, the language model score look-ahead value "90" (difference value of "40") is imparted to the branch that leads to "k". In general, in speech recognition, triphones (three-set phonemes) in consideration of the surrounding context are used as the recognition unit. Thus, regarding the hypothesis of "okasi" (meaning: "snack"), the right context "k" is also considered at the phoneme "o" of the beginning in the phoneme string of "o-k-a-s-i" (meaning: "snack"), and the poor language model score of "90" is all added. Thus, by examining coincidence of the phoneme of "k" and the following phonemes, even when the high acoustic model score is obtained and "okasi" (meaning: "snack") is the correct answer hypothesis, addition of the large language model score look-ahead value at an earlier stage promotes pruning, which causes recognition error.

Further, FIG. 10 shows an example of a word dictionary and a language model score look-ahead value using the tree structure dictionary as the word dictionary 403. In FIG. 10, the recognition target word includes "cancel" (Japanese pronunciation: "kyanseru"). Although there are a plurality of recognition target words starting with the chain of the phonemes "ky" and "a", each language model score is as poor as "100". In this case, the optimal language model score acquisition means 401 imparts the language model score look-ahead value "50" to the branch that leads to "ky", and imparts the language model score look-ahead value "100" (difference value of "50") to the branch that leads to "a". In this way, the poor language model score of "100" is all added to the hypothesis of the word that starts from the chain of phonemes "ky" and "a" at the time of phoneme "ky" at the beginning of the word. Thus, by examining coincidence of the phoneme of "a" and the following phonemes, even when the high acoustic model score is obtained and "kyanseru" (meaning: "cancel") is the correct answer hypothesis, addition of the large language model score look-ahead value at an earlier stage promotes pruning, which causes recognition error.

The above example is a tree structure dictionary. The same problem occurs also when a linear dictionary is used as the word dictionary 403. FIG. 11 is an example of the word dictionary and the language model score look-ahead value using a linear dictionary as the word dictionary 403. In FIG. 11, the recognition target word includes "belt" (Japanese pronunciation: "beruto"). In the linear dictionary, the language model score of the word can be imparted as the language model score look-ahead value from the word head of every word. However, when the language model score of "beruto" (meaning: "belt") is as poor as "100" as shown in the example, all the language model scores are added to the accumulated score when the head part of the word is connected to the previous hypothesis, which promotes pruning.

One of the methods to prevent the correct answer hypothesis from being pruned is to widen a beam width. However, another problem occurs by widening the beam width that the number of hypotheses increases and the calculation amount increases.

An object of the present invention is to provide a language model score look-ahead value imparting device, a language model score look-ahead value imparting method, and a program storage medium that prevent the pruning of a correct answer hypothesis while suppressing an increase in the number of hypotheses.

Solution to Problem

A language model score look-ahead value imparting device according to the present invention includes a word dictionary that defines a phoneme string of a word, a language model that imparts a score of appearance easiness of a word, and a smoothing language model score look-ahead value calculation means that obtains a language model score look-ahead value at each phoneme in the word from the phoneme string of the word defined by the word dictionary and the score defined by the language model so that the language model score look-ahead values are prevented from concentrating on the beginning of the word.

Advantageous Effects of Invention

According to the present invention, it is possible to prevent the pruning of a correct answer hypothesis while suppressing an increase in the number of hypotheses. The reason for it is that a language model score look-ahead value at each phoneme in a word is obtained so that the language model score look-ahead values are prevented from concentrating on the beginning of the word.

REFERENCE SIGNS LIST

101 SPEECH INPUT MEANS
102 ACOUSTIC ANALYSIS MEANS
103 DISTANCE CALCULATION MEANS
104 ACOUSTIC MODEL
105 SEARCHING MEANS
106 ORIGINAL SEARCHING MEANS
107 WORD END PROCESSING MEANS
108 LANGUAGE MODEL SCORE LOOK-AHEAD VALUE IMPARTING DEVICE
109 RECOGNITION RESULT OUTPUT MEANS
201 SMOOTHING LANGUAGE MODEL SCORE LOOK-AHEAD VALUE CALCULATION MEANS
202 LANGUAGE MODEL
203 WORD DICTIONARY
301 SPEECH INPUT MEANS
302 ACOUSTIC ANALYSIS MEANS
303 DISTANCE CALCULATION MEANS
304 ACOUSTIC MODEL
305 SEARCHING MEANS
306 ORIGINAL SEARCHING MEANS
307 WORD END PROCESSING MEANS
308 LANGUAGE MODEL SCORE LOOK-AHEAD VALUE IMPARTING DEVICE
309 RECOGNITION RESULT OUTPUT MEANS
401 OPTIMAL LANGUAGE MODEL SCORE ACQUISITION MEANS
402 LANGUAGE MODEL
403 WORD DICTIONARY

DESCRIPTION OF EMBODIMENTS

The specific exemplary embodiments of the present invention will be described in detail with reference to the drawings.
[First Exemplary Embodiment]

Figure 1:
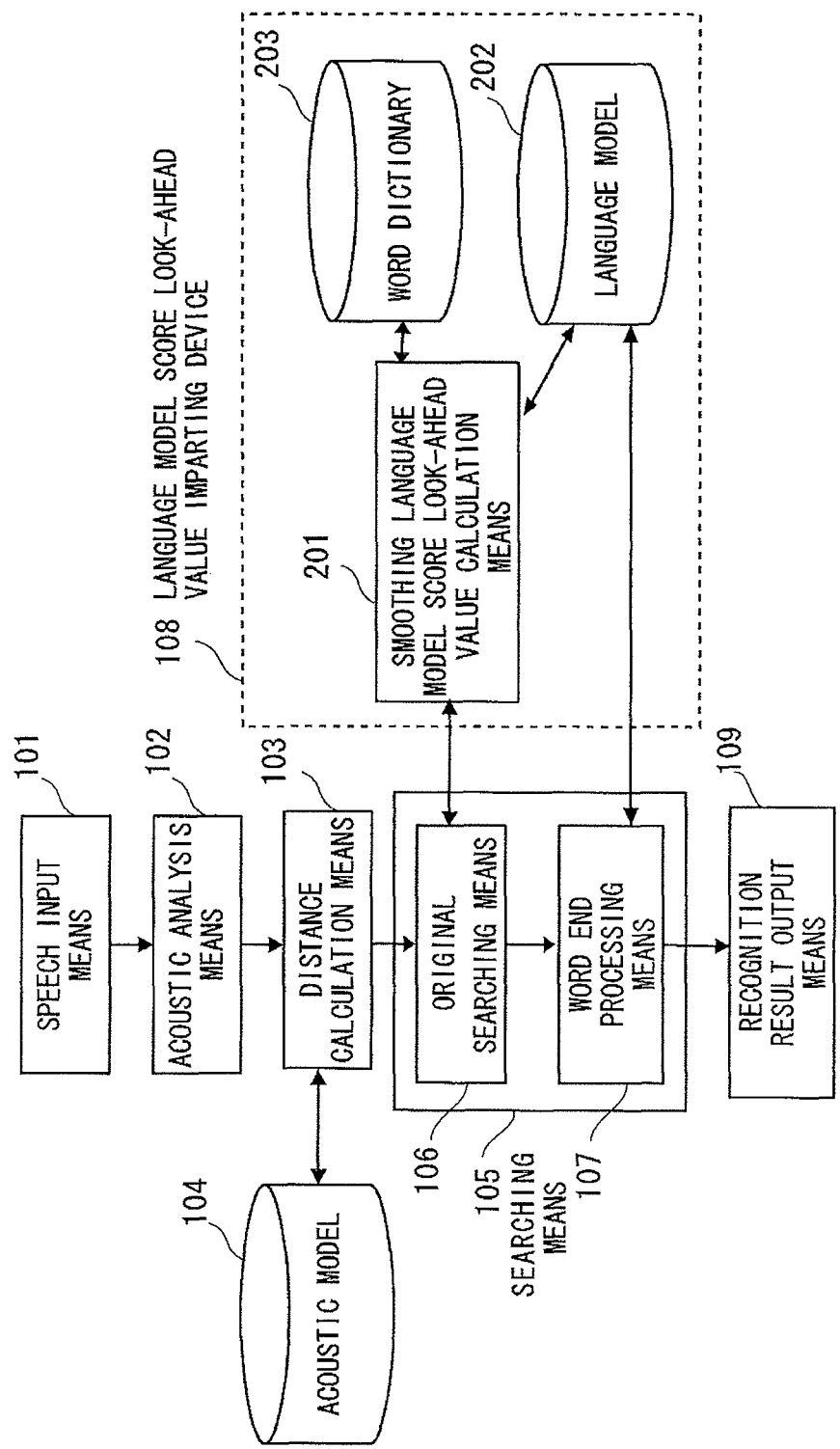
FIG. 1 is a block diagram showing a configuration of a first exemplary embodiment of the present invention.

Referring to FIG. 1, a speech recognition apparatus according to a first exemplary embodiment of the present invention includes a speech input means 101, an acoustic analysis means 102, a distance calculation means 103, an acoustic model 104, a searching means 105, a language model score look-ahead value imparting device 108, and a recognition result output means 109. Further, the searching means 105 includes a original searching means 106 and a word end processing means 107. Further, the language model score look-ahead value imparting device 108 includes a smoothing language model score look-ahead value calculation means 201, a language model 202, and a word dictionary 203. Each of these elements has the following function.

The acoustic model 104 imparts an acoustic feature amount of a phoneme or a phoneme string to the phoneme or the phoneme string. The word dictionary 203 defines a phoneme string of a word, and a tree structure dictionary is used in the first exemplary embodiment. The tree structure dictionary records correspondence of words and its phoneme strings. In the tree structure dictionary, the tree structure is formed by sharing a common head phoneme string among words. The language model 202 imparts to a word or a word string a score of appearance easiness of the word or the word string. In the first exemplary embodiment, the language model 202 includes a unigram language model and a bigram language model.

The smoothing language model score look-ahead value calculation means 201 obtains a language model score look-ahead value at each phoneme in a word from a phoneme string of the word defined by the word dictionary 203 and a language model score defined by the language model 202 (unigram language model score in the first exemplary embodiment) so that the language model score look-ahead values are prevented from concentrating on the beginning of the word. More specifically, a language model score look-ahead value at each phoneme in the word is obtained based on an appearance order of the phoneme in the word, so as to prevent the language model score look-ahead value at a head phoneme or a phoneme close to the head phoneme of the word from being substantially equal to the language model score of the word. It is not necessarily mean that the language model score look-ahead values need to be prevented from concentrating on the beginning of the word for all words. It is only necessary that the language model score look-ahead values are prevented from concentrating on the beginning of the word for a part of the word or all of the words having relatively poor language model score compared with other words.

The speech input means 101 supplies speech waveforms that are speech recognition targets. The acoustic analysis means 102 calculates an acoustic feature amount from the input speech waveforms for each frame. The distance calculation means 103 calculates an acoustic model score according to the distance between the acoustic model and the acoustic feature amount of the input speech waveforms for each frame.

The searching means 105 searches and outputs, from candidate word strings (hypotheses) obtained by combining words in the word dictionary 203, a word string having the largest accumulated score of the probability value that the pronunciation of each word calculated as the acoustic model score using the acoustic model 104 outputs input speech waveforms and the probability value of a word chain calculated as the language model score using the language model 202. The searching means 105 includes the word end processing means 107 that performs word end processing and the original searching means 106 that performs other search processing.

The recognition result output means 109 outputs the recognition result output from the searching means 105.

Figure 2:
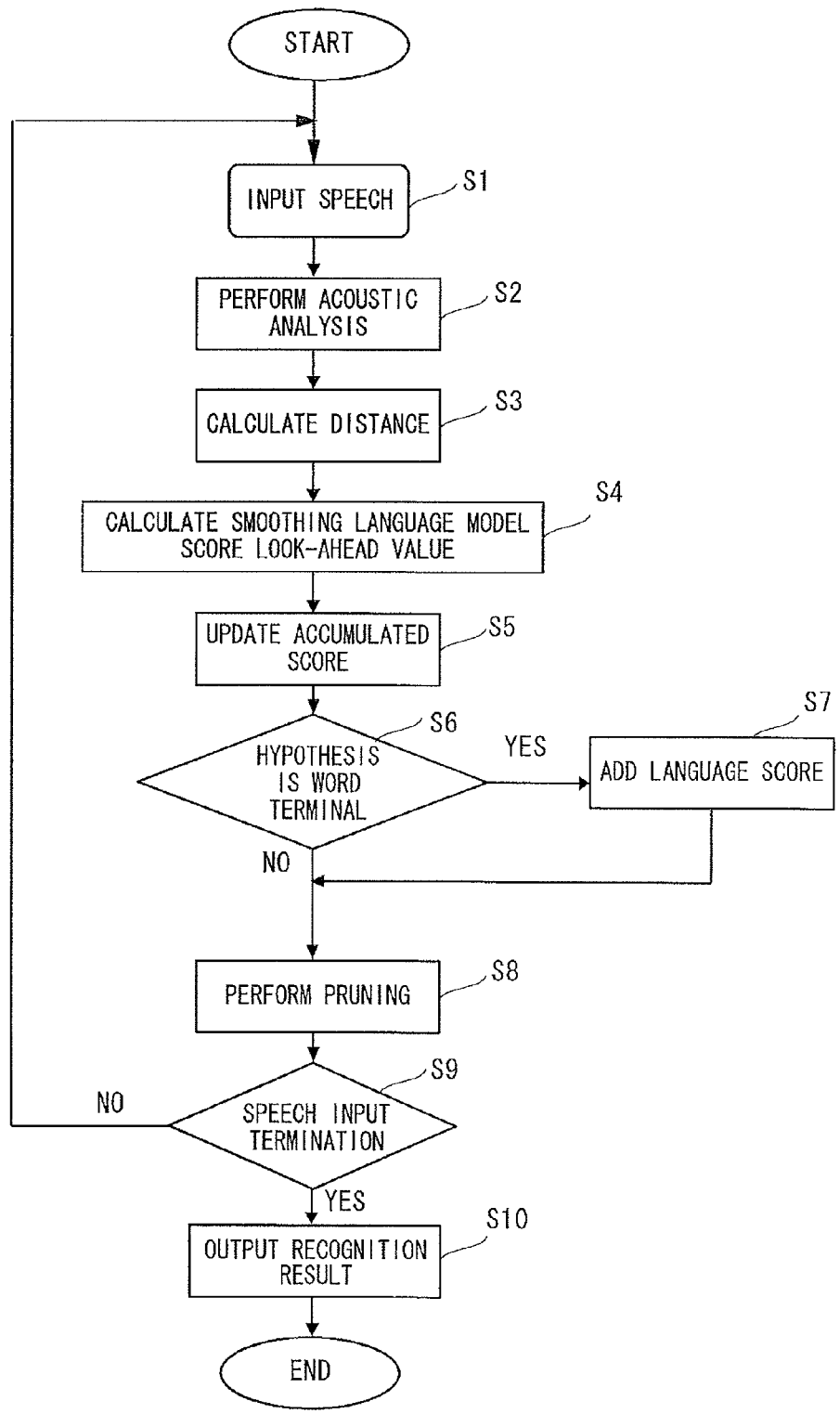
FIG. 2 is a flow chart showing an operation of the first exemplary embodiment of the present invention.

The whole operation of the first exemplary embodiment will be described in detail with reference to FIG. 1 and a flow chart shown in FIG. 2.

First, in step S1, speech waveforms are supplied using the speech input means 101.

Next, in step S2, the acoustic analysis means 102 receives the speech waveforms, calculates an acoustic feature amount such as a cepstrum, and outputs the acoustic feature amount.

Next, in step S3, the distance calculation means 103 receives the acoustic feature amount, calculates the distance of the acoustic model 104 from each model, and outputs the acoustic model score.

Next, in step S4, the smoothing language model score look-ahead value calculation means 201 calculates the language model score look-ahead value in all the hypotheses that are to be searched.

Next, in step S5, the original searching means 106 adds the acoustic model score and the language model score look-ahead value to the accumulated score for each hypothesis, so as to update the accumulated score.

Next, in step S6, it is determined whether the hypothesis is the word end. When the hypothesis is the word end, in step S7, the word end processing means 107 corrects the language model score look-ahead value by the added unigram language model to the bigram language model score obtained from the language model 203.

Next, in step S8, the hypothesis having poor accumulated score is pruned. For example, the pruning is performed by a method of discarding a hypothesis which is below a likelihood threshold value, or a method of leaving a certain number of higher-level hypotheses and discarding the others.

Next, in step S9, it is determined whether the speech input is terminated. When the input still continues, the process goes back to step S1, so as to perform the similar processing on the new input. When the input is terminated, the process goes on to step S10.

Last, in step S10, the recognition result output means 109 receives the result from the searching means 105, and outputs the optimal recognition result. Alternatively, the recognition result output means 109 may output some of the top recognition results in addition to the optimal recognition result.

Next, an advantageous effect of the first exemplary embodiment will be described.

According to the first exemplary embodiment, it is possible to prevent a correct answer hypothesis from being pruned, thereby reducing a recognition error rate. The reason for it is that since the language model score look-ahead values are prevented from concentrating on the beginning of the word, an early pruning of the correct answer hypothesis due to the concentration of the language model score look-ahead values on the beginning of the word is prevented.

Furthermore, according to the present invention, it is possible to suppress an increase in the number of hypotheses compared with a case of widening the beam width. The reason for it is that, although the calculation amount is increased as a result of the operation that the language model score look-ahead values are prevented from concentrating on the beginning of the word, only the calculation amount of the hypothesis pruned due to the concentration of the language model score look-ahead value on the beginning of the word is increased, which is only a slight increase. On the other hand, in the method of widening the beam width, even the hypothesis having poor acoustic model score and the word having poor score in the word end remain in the search space without being pruned, which further increases the calculation amount of the hypothesis.

Next, examples of the smoothing language model score look-ahead value calculation means 201 will be described in detail.

[First Example of Smoothing Language Model Score Look-Ahead Value Calculation Means 201]

The smoothing language model score look-ahead value calculation means 201 of a first example calculates the language model score look-ahead value in each phoneme of a word based on the number of phonemes from the word head to this phoneme. More specifically, calculation is performed by defining the smoothing language model score look-ahead value as expressed in expressions (3) and (4).

$$\pi'h(s) = \min w \in W(s)\{-\log p(w|h)\} \quad (3)$$

$$\pi h(s) = \pi'h(s) \text{ if } \pi'h(s) <= T(d(s)) \text{ or } s \in E = T(d(s)) \text{ otherwise} \quad (4)$$

In the expression (3), the optimal value $\pi'h(s)$ of the language model score is obtained as in the expression (1). In the expression (4), the threshold value $T(n)$ is determined depending on what number of phoneme the phoneme s is (n-th phoneme) from the head. When the phoneme s is the $d(s)$-th phoneme from the head, the language model score look-ahead value is added only up to the value of the threshold value $T(d(s))$ if $\pi'h(s)$ exceeds $T(d(s))$. Here, the threshold value is determined so that $T(n)$ decreases with decreasing n. Accordingly, it is possible to prevent the language model score look-ahead value from being concentrated on the beginning of the word. The symbol E is the set of the last phoneme of the word.

Figure 3:
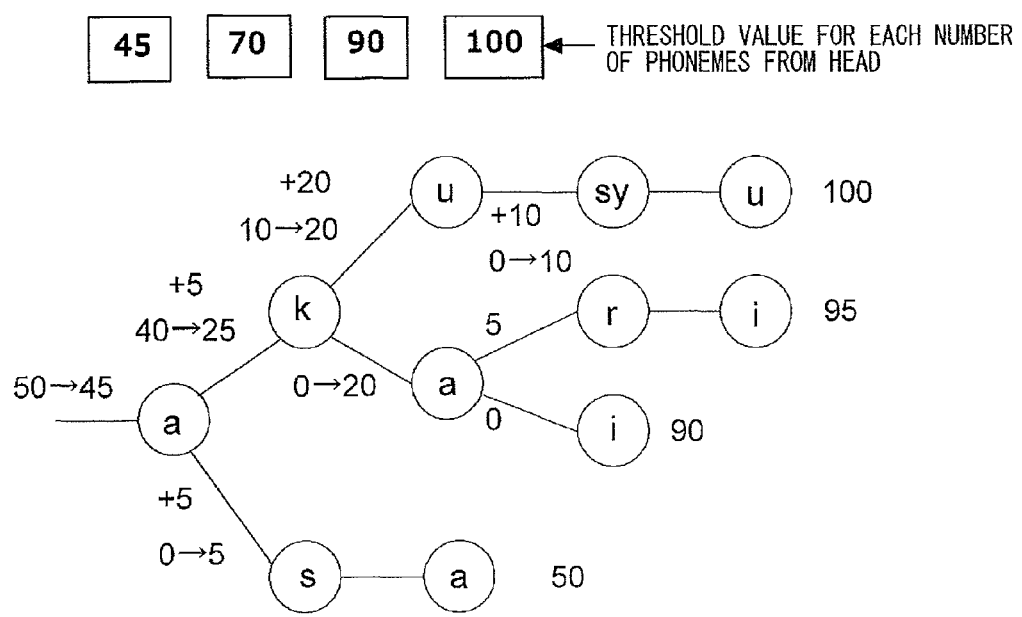
FIG. 3 is an operation explanatory diagram of a first example of a smoothing language model score look-ahead value calculation means.

FIG. 3 shows a specific example of the language model score look-ahead value when the first example is operated using the tree structure dictionary.

First, the threshold value $T(d)$ of the language model look-ahead value is determined for each of the number of phonemes from the word head. For example, the threshold value is determined as "45", "70", "90", and "100" from the first phoneme to the fourth phoneme in order. The threshold value $T(d)$ may be predetermined and set in the smoothing language model score look-ahead value calculation means 201, the word dictionary 203, or the language model 202. Alternatively, the threshold value $T(d)$ may be determined by the smoothing language model score look-ahead value calculation means 201 when the smoothing language model score look-ahead value is calculated.

Next, when the optimal language score of the first phoneme exceeds the threshold value of the first phoneme, the language model score look-ahead difference value of the branch that leads to the first phoneme is the threshold value of the first phoneme, and the value that exceeds the threshold value of the first phoneme is carried to the branch that leads to the next phoneme. For example, the optimal language score of the first phoneme "a" is "50", which exceeds the threshold value of the first phoneme "45" by "5". Thus, the language model score look-ahead difference value of the branch that leads to the first phoneme "a" is set to "45", which is equal to the threshold value of the first phoneme, and the value "5" that exceeds the threshold value is carried to the branch that leads to the next phoneme. Further, the similar processing is repeated for the branch that leads to the next phoneme as well. In the word end phoneme, the language model score look-ahead difference value is imparted so that the optimal language score is the language model score look-ahead value even when the score exceeds the threshold value of the phoneme. For example, the optimal language score of the second phoneme "k" is "90", which exceeds the threshold value of the second phoneme "70" by "20". Thus, the threshold value of the second phoneme "70" is the language model score look-ahead value of the second phoneme "k". The value "25", which is obtained by subtracting "45" which is the language model score look-ahead value added to the first phoneme "a" from this value "70", is the language model look-ahead difference value of the branch that leads to the second phoneme "k", and the value "20" which exceeds the threshold value is carried to the branch that leads to the next phoneme. From the procedure stated above, it is possible to prevent an excessive language model look-ahead value that exceeds the threshold value from being added.

[Second Example of Smoothing Language Model Score Look-Ahead Value Calculation Means 201]

The smoothing language model score look-ahead value calculation means 201 of a second example calculates the language model score look-ahead value in each phoneme in a word based on the number of phonemes of a word that can be traced from the phoneme. More specifically, the calculation is performed by defining the smoothing language model score look-ahead value as expressed in expressions (5) and (6).

$$\delta h(s) = \min_{w \in W(s)} [\{-\log p(w|h) - \pi h(s\sim)\}/\{N(w) - d(s)+1\}] \quad (5)$$

$$\pi h(s) = \pi h(s\sim) + \delta h(s) \quad (6)$$

The symbol N(w) denotes the number of phonemes of the word w. The symbol d(s) indicates that the phoneme s is the d(s)-th phoneme similarly to the first example.

In the second example, a value obtained by equally dividing the language model score by the number of phonemes of a word is used as the language model look-ahead difference value. The numerator in the expression (5) is the value obtained by subtracting the language model score look-ahead value added before the previous phoneme s~ from the language model score, and the denominator is the number of phonemes of phoneme s and the subsequent phonemes in the word w. Thus, the language model score is equally divided by the number of phonemes, and the minimum value in the word w that can be traced from s is imparted to the branch that leads to the phoneme s as the language model score look-ahead difference value δh(s). The language model score look-ahead value πh(s) can be obtained by adding the difference value to the language model score look-ahead value of the previous phoneme s~ from the expression (6).

Figure 4:
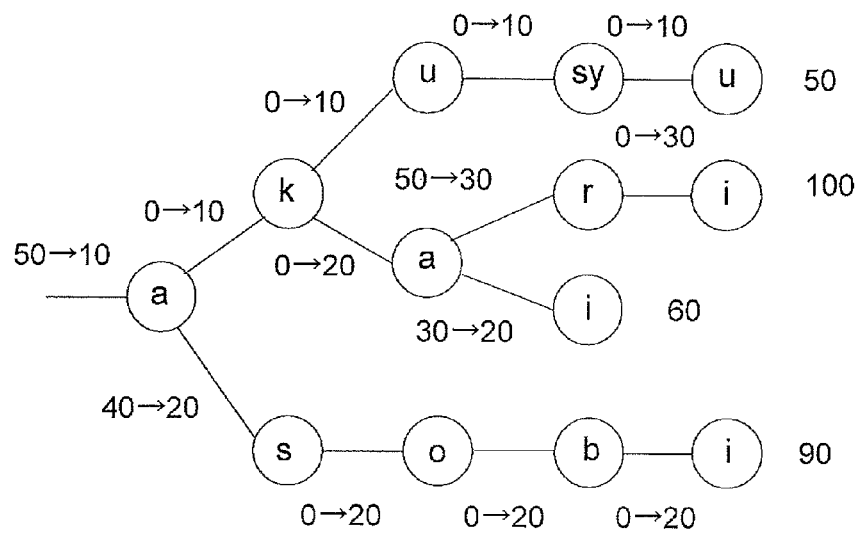
FIG. 4 is an operation explanatory diagram of a second example of the smoothing language model score look-ahead value calculation means.

FIG. 4 shows a specific example of the language model score look-ahead value when the second example is operated using the tree structure dictionary.

In the first phoneme shown in FIG. 4, there are four words that can be traced. The word "a-k-u-sy-u" (meaning: "handshake") has five phonemes, and its language model score is "50". Thus, each branch has the value of "10" as a result of equally dividing "50" by five. Further, the word "a-k-a-i" (meaning: "red") has four phonemes, and its language model score is "60". Thus, each branch has the value of "15" as a result of equally dividing "60" by four. When the calculation is made for all of the words, the minimum value is "10", which is obtained by equally dividing the language model score of "a-k-u-sy-u" (meaning: "handshake"). Thus, the language model score look-ahead difference value of "10" is imparted to the branch that leads to "a" of the first phoneme. Next, regarding the phoneme "s" and the subsequent phonemes of "a-s-o-b-i" (meaning: "play"), the language model score that is not added at "a" is "80", which is calculated by subtracting "10" of the language model score look-ahead difference value of the phoneme "a" from "90" of the language model score, and the number of phonemes of "s" and the subsequent phonemes is 4. When the value "80" is equally divided by four, each branch has the value of "20". This processing is repeatedly performed also to the next phoneme, so as to determine the language model score look-ahead value.

From the description above, since the language model score look-ahead value is distributed from the head to the end terminal of the word, the language model look-ahead value is smoothed, and an excessive language model look-ahead value is not added in the word head.

[Third Example of Smoothing Language Model Score Look-Ahead Value Calculation Means 201]

In the smoothing language model score look-ahead value calculation means 201 of the third example, the language model score look-ahead value in each phoneme in a word is obtained based on the number of phonemes of a phoneme string having no branching and including the phoneme. More specifically, the calculation is performed by defining the smoothing language model score look-ahead value as expressed in expression (7).

$$\delta h(s) = \{\delta h(s) - \pi h(s\sim)\}/m(s) \text{ if } s\sim \in B = \delta h(s\sim) \text{ otherwise} \quad (7)$$

The symbol B is a set of phonemes having branching in the tree structure dictionary. The symbol m(s) indicates the difference between the number of phonemes from the head of the phonemes having branching in the tree structure that appears the first after s and the number of phonemes from the head to the previous phoneme s~. When there is no branching in the tree structure after s, the symbol m(s) indicates the difference between the number of phonemes to the phoneme of the word end from the head and the number of phonemes of the previous phoneme s~ from the head.

First, the optimal value πh(s) of the language model score is obtained by the expression (1) in the similar way as the related art. In the third example, when there is a branch that has no branching, instead of imparting the difference value of the optimal value, it is equally divided by m(s), which indicates the number of branches having no branching, so as to smooth the language model score look-ahead value.

Figure 5:
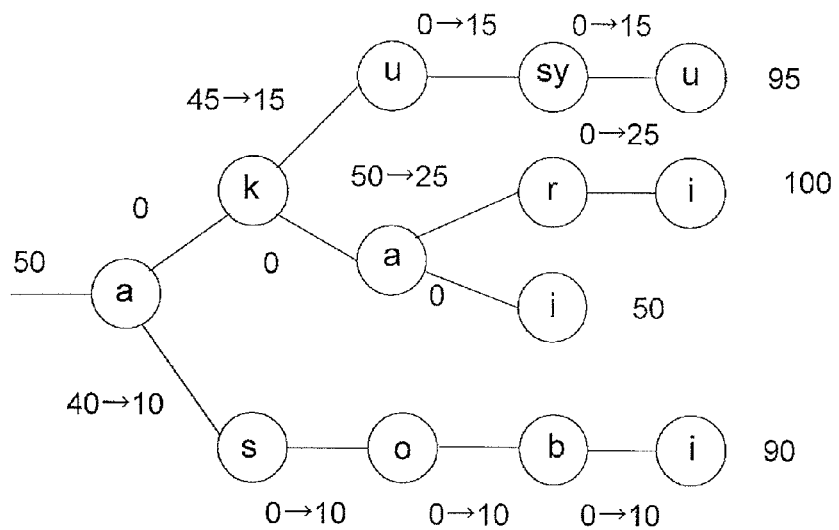
FIG. 5 is an operation explanatory diagram of a third example of the smoothing language model score look-ahead value calculation means.
Figure 6:
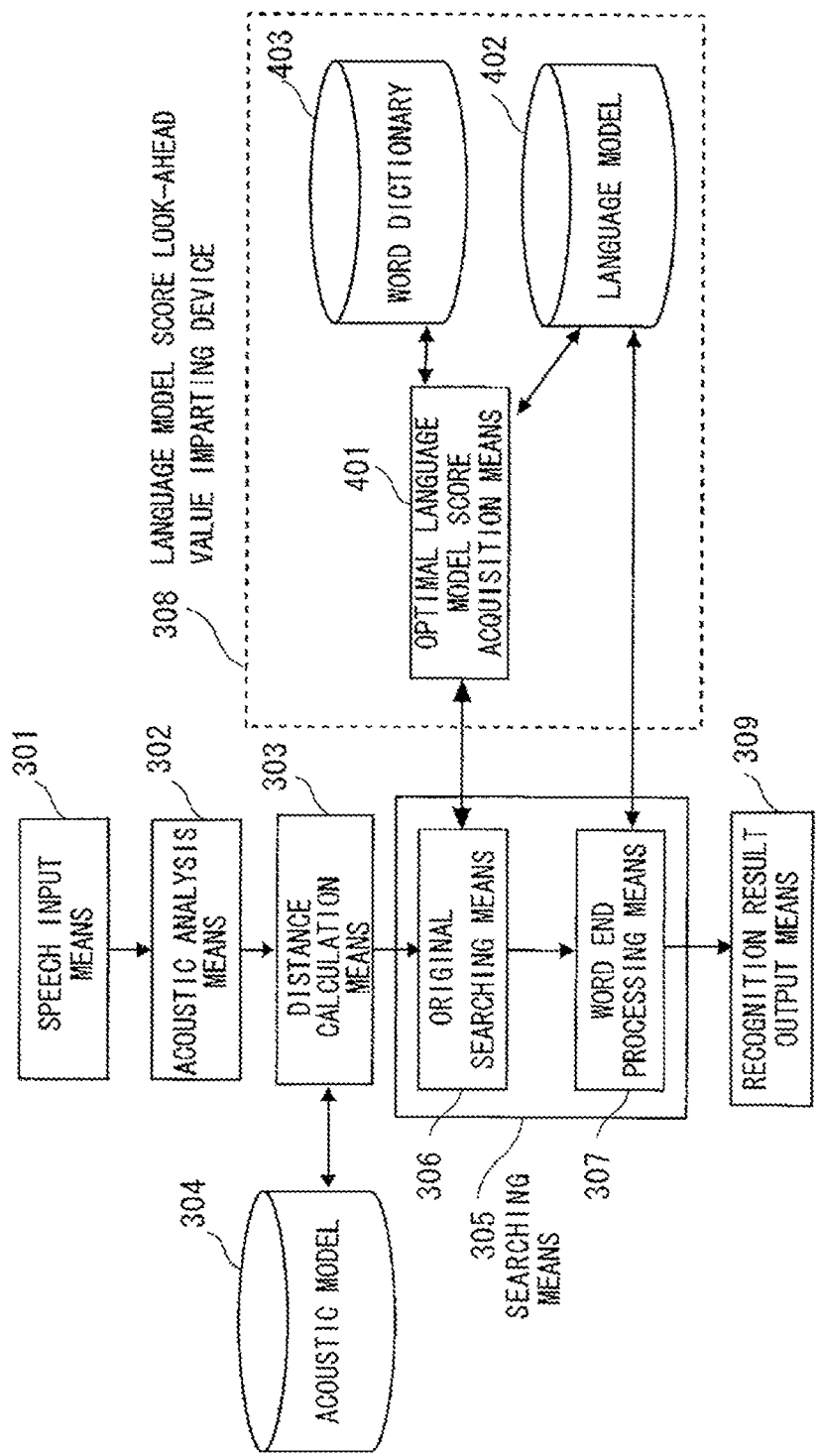
FIG. 6 is a block diagram showing a configuration of a speech recognition apparatus that relates to the present invention.
Figure 7:
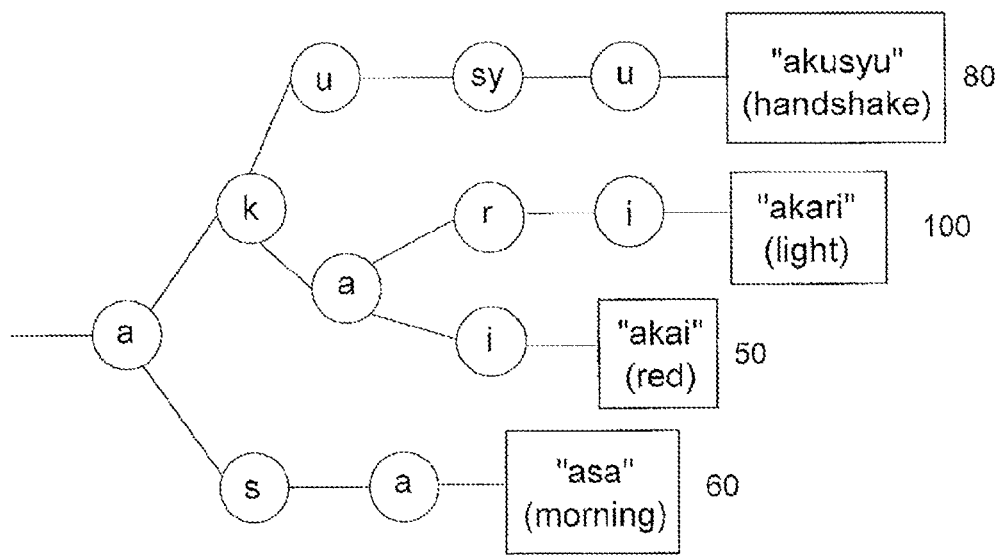
FIG. 7 is a diagram showing one example of a tree structure dictionary.
Figure 8:
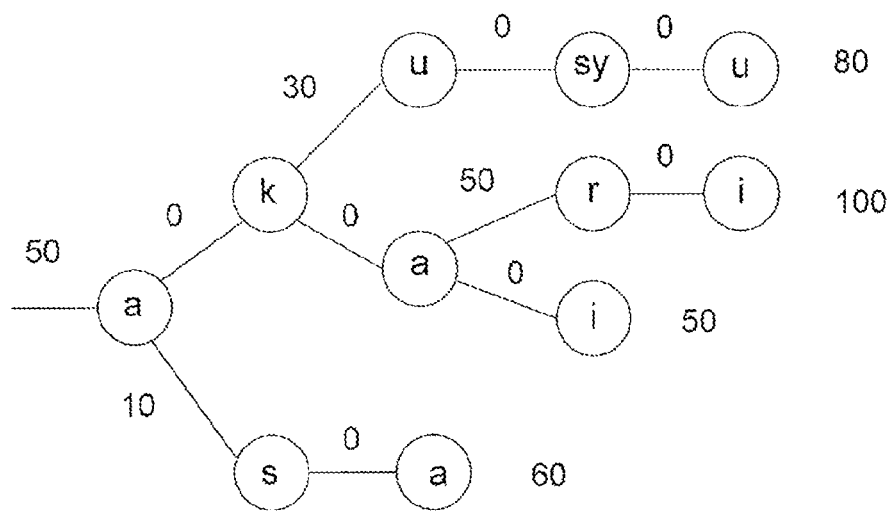
FIG. 8 is a diagram showing one example of a language model score look-ahead value given by using an optimal language model score acquisition means.
Figure 9:
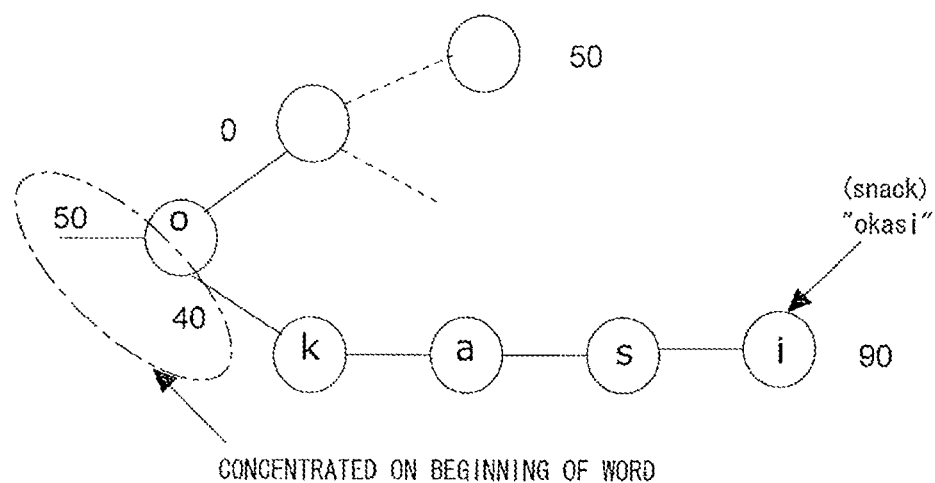
FIG. 9 is a diagram showing another example of the language model score look-ahead value given by using the optimal language model score acquisition means.
Figure 10:
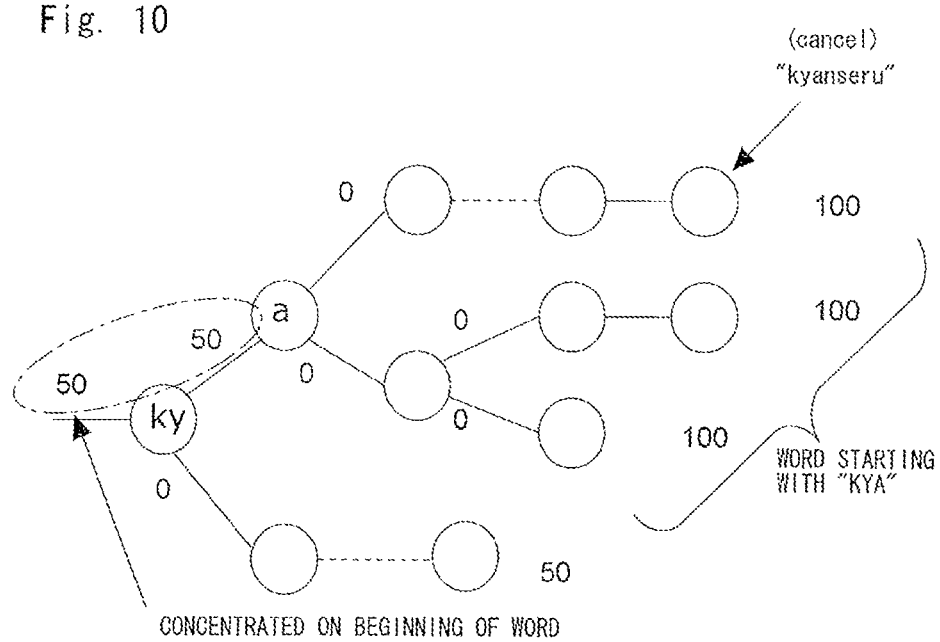
FIG. 10 is a diagram showing another example of the language model score look-ahead value given by using the optimal language model score acquisition means.
Figure 11:
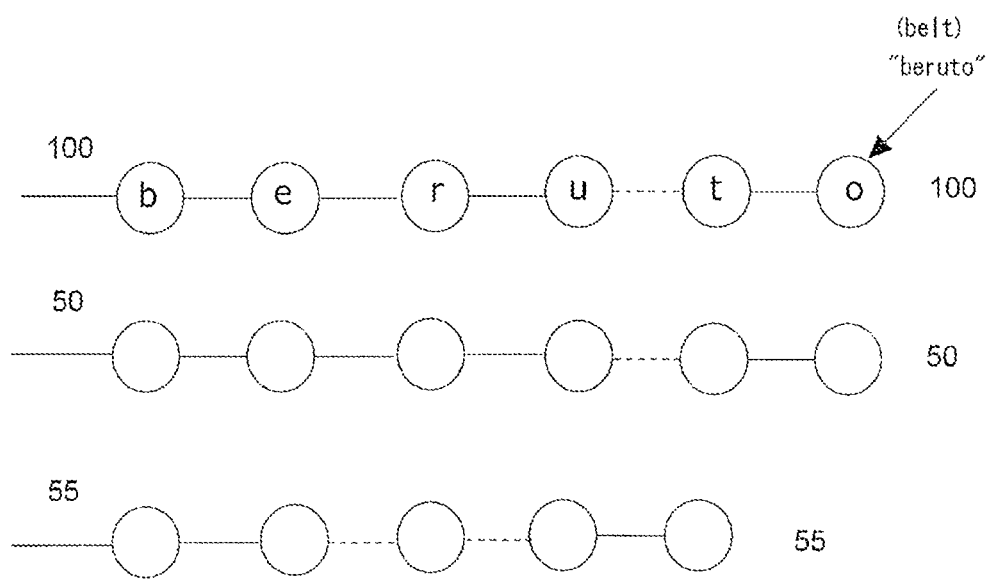
FIG. 11 is a diagram showing an example of a linear dictionary and a language model score look-ahead value.

FIG. 5 shows a specific example of the language model score look-ahead value when the third example is operated using the tree structure dictionary.

In the related method, regarding the lowest part "a-s-o-b-i" (meaning: "play") in FIG. 5, the branch "a-s" that connects "a" and "s" has the language model score look-ahead difference value of "40". In the third example, each of "s", "o", and "b" only has one branch and has no branching. Thus, the language model score look-ahead difference value imparted to the branch "a-s" is also distributed to these branches. Since there is no branching in and after the phoneme "s", the number of phonemes from the head to the word end phoneme is used. Since the word end phoneme "i" is the fifth phoneme from the head and s~ is the first phoneme "a", the difference m(s) is "4". Thus, the language model score look-ahead difference value "40" of the branch "a-s" is equally distributed to each of the four branches "a-s", "s-o", "o-b", and "b-i", so that each of the branches has the language model score look-ahead difference value of "10".

Similarly, the language model score look-ahead difference value is also distributed in "k-u-sy-u" and "a-r-i". From the above description, the language model score look-ahead value is smoothed, and it is possible to prevent an excessive language model look-ahead value from being added in the beginning of the word.

[Other Exemplary Embodiments]

Although the look-ahead is performed with the unigram language model and the unigram language model is replaced with the bigram language model in the word end processing in the above exemplary embodiment, the language model used in the look-ahead or the language model replaced in the word end processing may be variously changed. For example, the look-ahead may be performed with the bigram language model and the bigram language model may be replaced with a trigram language model by word end processing. Furthermore, such embodiment may be possible that the word end processing is not performed and the bigram language model or the trigram language model is used from the time point of look-ahead.

Although the tree structure dictionary is used as the word dictionary 203 in the exemplary embodiment and the first to third examples, the same method can be used even when a linear dictionary is used as the word dictionary 203.

In the exemplary embodiment stated above, the smoothing language model score look-ahead value is calculated each time. However, the smoothing language model score look-ahead values may be calculated in advance and stored in the word dictionary 203 or the language model 202, for example. Then, the smoothing language model score look-ahead value calculation means 201 may search and acquire in the search process the corresponding value from the smoothing language model score look-ahead values that are stored.

Further, the smoothing language model score look-ahead value calculation means 201, the speech input means 101, the acoustic analysis means 102, the distance calculation means 103, the searching means 105, and the recognition result output means 109 may be implemented by a computer and a program, in addition to hardware. The program is recorded in a computer readable recording medium such as a magnetic disk, a semiconductor memory, or the like to be provided, read by a computer when the computer is started up, and controls the operation of the computer, so as to operate the computer as each of the means, and to cause the computer to execute the processing described above.

Although the present invention has been described with reference to the exemplary embodiments (and examples), the present invention is not limited to the exemplary embodiments (and examples) described above. Various changes that can be understood by a person skilled in the art can be made to the structures and details of the present invention within the scope of the present invention.

This application claims the benefit of priority, and incorporates herein by reference in its entirety, the following Japanese Patent Application No. 2008-129937 filed on May 16, 2008.

INDUSTRIAL APPLICABILITY

The present invention is applicable to a general speech recognition system such as a speech conversational system, information search, and automatic interpretation using a speech recognition.

The invention claimed is:

1. A language model score look-ahead value imparting device that comprises:
    a word dictionary that defines a phoneme string of a word;
    a language model that imparts a score of appearance easiness of a word; and
    a smoothing language model score look-ahead value calculation unit, implemented by a processor, that obtains a language model score look-ahead value at each phoneme in the word from the phoneme string of the word defined by the word dictionary and the score defined by the language model, prevents the language model score look-ahead values from concentrating on the beginning of the word by distributing the language model score look-ahead value corresponding to the phoneme at the beginning of the word to one or more phoneme that are not at the beginning of the word, and obtains an updated language model score look-ahead value at each of the phoneme based on the distribution.

2. The language model score look-ahead value imparting device according to claim 1, wherein the smoothing language model score look-ahead value calculation unit obtains the language model score look-ahead value at each phoneme in the word based on an appearance order of the phoneme in the word.

3. The language model score look-ahead value imparting device according to claim 2, wherein the smoothing language model score look-ahead value calculation unit obtains the language model score look-ahead value at each phoneme in the word based on the number of phonemes from a word head to the phoneme.

4. The language model score look-ahead value imparting device according to claim 3, wherein the smoothing language model score look-ahead value calculation unit obtains a language model score look-ahead value which is within a threshold value of the language model score look-ahead value set based on the number of phonemes from a word head to a phoneme.

5. The language model score look-ahead value imparting device according to claim 2, wherein the smoothing language model score look-ahead value calculation unit obtains the language model score look-ahead value at each phoneme in the word based on the number of phonemes of a word that can be traced from the phoneme.

6. The language model score look-ahead value imparting device according to claim 5, wherein the smoothing language model score look-ahead value calculation unit obtains the language model score look-ahead value so that a language model score look-ahead difference value is equally divided by phonemes that can be traced from the phoneme based on the number of phonemes of a word that can be traced from the phoneme.

7. The language model score look-ahead value imparting device according to claim 2, wherein the smoothing language model score look-ahead value calculation unit obtains the language model score look-ahead value at each phoneme in the word based on the number of phonemes of a phoneme string having no branching and including the phoneme.

8. The language model score look-ahead value imparting device according to claim 7, wherein the smoothing language model score look-ahead value calculation unit obtains the language model score look-ahead value so that a language model score look-ahead difference value is equally divided by phonemes having no branching based on the number of phonemes of a phoneme string having no branching and including the phoneme.

9. A speech recognition apparatus that performs frame synchronous beam search using a language model score look-ahead value, the speech recognition apparatus comprising the language model score look-ahead value imparting device according to claim 1.

10. A computer processor implemented language model score look-ahead value imparting method, the method comprising:
    obtaining a language model score look-ahead value at each phoneme in a word from a phoneme string of the word defined by a word dictionary and a score defined by a language model;
    preventing, by the computer processor, the language model score look-ahead values from concentrating on the beginning of the word by distributing the language model score look-ahead value corresponding to the phoneme at the beginning of the word to one or more phoneme that are not at the beginning of the word; and obtaining an updated language model score look-ahead value at each of the phoneme based on the distribution.

11. The language model score look-ahead value imparting method according to claim 10, wherein the language model score look-ahead value at each phoneme in the word is obtained based on an appearance order of the phoneme in the word.

12. The language model score look-ahead value imparting method according to claim 11, wherein the language model score look-ahead value at each phoneme in the word is obtained based on the number of phonemes from a word head to the phoneme.

13. The language model score look-ahead value imparting method according to claim 12, wherein a language model score look-ahead value which is within a threshold value of the language model score look-ahead value set based on the number of phonemes from a word head to a phoneme is obtained.

14. The language model score look-ahead value imparting method according to claim 11, wherein the language model score look-ahead value at each phoneme in the word is obtained based on the number of phonemes of a word that can be traced from the phoneme.

15. The language model score look-ahead value imparting method according to claim 14, wherein the language model score look-ahead value is obtained so that a language model score look-ahead difference value is equally divided by phonemes that can be traced from the phoneme based on the number of phonemes of a word that can be traced from the phoneme.

16. The language model score look-ahead value imparting method according to claim 11, wherein the language model score look-ahead value at each phoneme in the word is obtained based on the number of phonemes of a phoneme string having no branching and including the phoneme.

17. The language model score look-ahead value imparting method according to claim 16, wherein the language model score look-ahead value is obtained so that a language model score look-ahead difference value is equally divided by phonemes having no branching based on the number of phonemes of a phoneme string having no branching and including the phoneme.

18. A speech recognition method that performs frame synchronous beam search using a language model score look-ahead value obtained by the language model score look-ahead value imparting method according to claim 10.

19. A non-transitory computer readable medium that readably records in a computer a language model score look-ahead value imparting program to cause the computer including a memory unit storing a word dictionary to define a phoneme string of a word and a language model to impart a score of appearance easiness of a word to execute a process of:
obtaining a language model score look-ahead value at each phoneme in the word from the phoneme string of the word defined by the word dictionary and the score defined by the language model;
preventing the language model score look-ahead values from concentrating on the beginning of the word by distributing the language model score look-ahead value corresponding to the phoneme at the beginning of the word to one or more phoneme that are not at the beginning of the word; and
obtaining an updated language model score look-ahead value at each of the phoneme based on the distribution.

20. The non-transitory computer readable medium according to claim 19, wherein the language model score look-ahead value at each phoneme in the word is obtained based on an appearance order of the phoneme in the word in the process.

21. The non-transitory computer readable medium according to claim 20, wherein the language model score look-ahead value at each phoneme in the word is obtained based on the number of phonemes from a word head to the phoneme in the process.

22. The p non-transitory computer readable medium according to claim 21, wherein a language model score look-ahead value which is within a threshold value of the language model score look-ahead value set based on the number of phonemes from a word head to a phoneme is obtained in the process.

23. The non-transitory computer readable medium according to claim 20, wherein the language model score look-ahead value at each phoneme in the word is obtained based on the number of phonemes of a word that can be traced from the phoneme in the process.

24. The non-transitory computer readable medium according to claim 23, wherein the language model score look-ahead value is obtained so that a language model score look-ahead difference value is equally divided by phonemes that can be traced from the phoneme based on the number of phonemes of a word that can be traced from the phoneme in the process.

25. The non-transitory computer readable medium according to claim 20, wherein the language model score look-ahead value at each phoneme in the word is obtained based on the number of phonemes of a phoneme string having no branching and including the phoneme in the process.

26. The non-transitory computer readable medium according to claim 25, wherein the language model score look-ahead value is obtained so that a language model score look-ahead difference value is equally divided by phonemes having no branching based on the number of phonemes of a phoneme string having no branching and including the phoneme in the process.

27. A non-transitory computer readable medium that records in a computer, in a computer-readable way, a speech recognition program to cause the computer to execute a speech recognition process that performs frame synchronous beam search using a language model score look-ahead value obtained by a language model score look-ahead value imparting program recorded in the program storage medium according to claim 19.

28. A language model score look-ahead value imparting device that comprises:
a word dictionary that defines a symbol string of a word indicating an acoustic model string;
a language model that imparts a score of appearance easiness of a word; and
a smoothing language model score look-ahead value calculation unit that obtains a language model score look-ahead value at each phoneme in the word from the symbol string of the word defined by the word dictionary and the score defined by the language model, prevents the language model score look-ahead values from concentrating on the beginning of the word by distributing the language model score look-ahead value corresponding to the phoneme at the beginning of the word to one or more phoneme that are not at the beginning of the word, and obtains an updated language model score look-ahead value at each of the phoneme based on the distribution.

29. A computer processor implemented language model score look-ahead value imparting method, the method comprising:
obtaining a language model score look-ahead value at each phoneme in a word from a symbol string of the word indicating an acoustic model string defined by a word dictionary and a score defined by a language model;
preventing, by the computer processor, the language model score look-ahead values from concentrating on the beginning of the word by distributing the language model score look-ahead value corresponding to the phoneme at the beginning of the word to one or more phoneme that are not at the beginning of the word; and obtaining an updated language model score look-ahead value at each of the phoneme based on the distribution.

30. A non-transitory computer readable medium that readably records in a computer a language model score look-ahead value imparting program to cause the computer including a memory unit storing a word dictionary to define a symbol string of a word indicating an acoustic model string and a language model to impart a score of appearance easiness of a word to execute a process of:

obtaining a language model score look-ahead value at each phoneme in the word from the symbol string of the word defined by the word dictionary and the score defined by the language model;

preventing the language model score look-ahead values from concentrating on the beginning of the word by distributing the language model score look-ahead value corresponding to the phoneme at the beginning of the word to one or more phoneme that are not at the beginning of the word; and obtaining an updated language model score look-ahead value at each of the phoneme based on the distribution.

31. A language model score look-ahead value imparting device that comprises:

a word dictionary that defines a phoneme string of a word;

a language model that imparts a score of appearance easiness of a word; and a smoothing language model score look-ahead value calculation means that obtains a language model score look-ahead value at each phoneme in the word from the phoneme string of the word defined by the word dictionary and the score defined by the language model, prevents the language model score look-ahead values from concentrating on the beginning of the word by distributing the language model score look-ahead value corresponding to the phoneme at the beginning of the word to one or more phoneme that are not at the beginning of the word, and obtains an updated language model score look-ahead value at each of the phoneme based on the distribution.

32. A language model score look-ahead value imparting device that comprises:

a word dictionary that defines a symbol string of a word indicating an acoustic model string;

a language model that imparts a score of appearance easiness of a word; and a smoothing language model score look-ahead value calculation means that obtains a language model score look-ahead value at each phoneme in the word from the symbol string of the word defined by the word dictionary and the score defined by the language model, prevents the language model score look-ahead values from concentrating on the beginning of the word by distributing the language model score look-ahead value corresponding to the phoneme at the beginning of the word to one or more phoneme that are not at the beginning of the word, and obtains an updated language model score look-ahead value at each of the phoneme based on the distribution.

* * * * *